(12) United States Patent  
Nelkenbaum

(10) Patent No.: US 8,792,904 B2  
(45) Date of Patent: Jul. 29, 2014

(54) SYSTEM AND METHOD FOR NON-COOPERATIVE STIMULATION OF MOBILE COMMUNICATION TERMINALS

(75) Inventor: Yossi Nelkenbaum, Ramat-Gan (IL)

(73) Assignee: Verint Systems, Ltd., Herzliya (IL)

(*) Notice: Subject to any disclaimer, the term of this patent is extended or adjusted under 35 U.S.C. 154(b) by 254 days.

(21) Appl. No.: 13/283,507

(22) Filed: Oct. 27, 2011

(65) Prior Publication Data

US 2012/0108262 A1 May 3, 2012

(30) Foreign Application Priority Data

Oct. 28, 2010 (IL) .......................................... 208969

(51) Int. Cl.
*H04W 24/00* (2009.01)

(52) U.S. Cl.
USPC ...................... 455/456.1; 455/450; 455/452.2; 455/455; 455/456.2; 455/456.5; 370/228

(58) Field of Classification Search
USPC ...................... 455/456.1, 450, 455, 456.2, 457
See application file for complete search history.

(56) References Cited

U.S. PATENT DOCUMENTS

2008/0220749 A1* 9/2008 Pridmore et al. .......... 455/414.1

FOREIGN PATENT DOCUMENTS

WO 2010116292 A2 10/2010
WO WO 2010116292 A2 * 10/2010

OTHER PUBLICATIONS

3GPP TS 24.008 v3.8.0, "3rd Generation Partnership Project; Technical Specification Group Core Network; Mobile radio interface layer 3 specification; Core Network Protocols—Stage 3," Release 1999, (Jun. 2001), 442 pages.
Asokan, N., et al., "Man-in-the-Middle in Tunneled Authentication Protocols," Draft version 1.3 (latest public version: http://eprint.iacr.org/2002/163/, Nov. 11, 2002, 15 pages.
Vedaldi, Andrea, "An implementation of SIFT detector and descriptor," University of California at Los Angeles, 7 pages.
Girardin, Fabien, et al., "Detecting air travel to survey passengers on a worldwide scale," Journal of Location Based Services, 26 pages.
Meyer, Ulrike, et al., "On the Impact of GSM Encryption and Man-in-the-Middle Attacks on the Security of Interoperating GSM/UMTS Networks," IEEE, 2004, 8 pages.

* cited by examiner

*Primary Examiner* — Wayne Cai
*Assistant Examiner* — Chuck Huynh
(74) *Attorney, Agent, or Firm* — Meunier Carlin & Curfman

(57) ABSTRACT

Methods and systems for locating Mobile Stations (MSs) that are served by a Wireless communication Network (WLN) in a given geographical area. The MSs typically communicate with other parties, or connect to the Internet, through the WLN, wherein Base Transceiver Stations (BTSs) serve as the WLN front ends from the MSs perspective. A Stimulating Apparatus (SA) monitors control messages that the BTSs in the area of the SA broadcast to MSs. The SA analyzes the control messages that it receives, selects one transmitting BTS and creates a modified version of the control messages that it has received from the selected BTS. The SA then broadcasts the modified messages on behalf of the selected BTS by using its frequency channel. The discrepant transmission parameters are designed to stimulate any MS that receives them to induce a network event from which the MS location may be estimated.

18 Claims, 2 Drawing Sheets

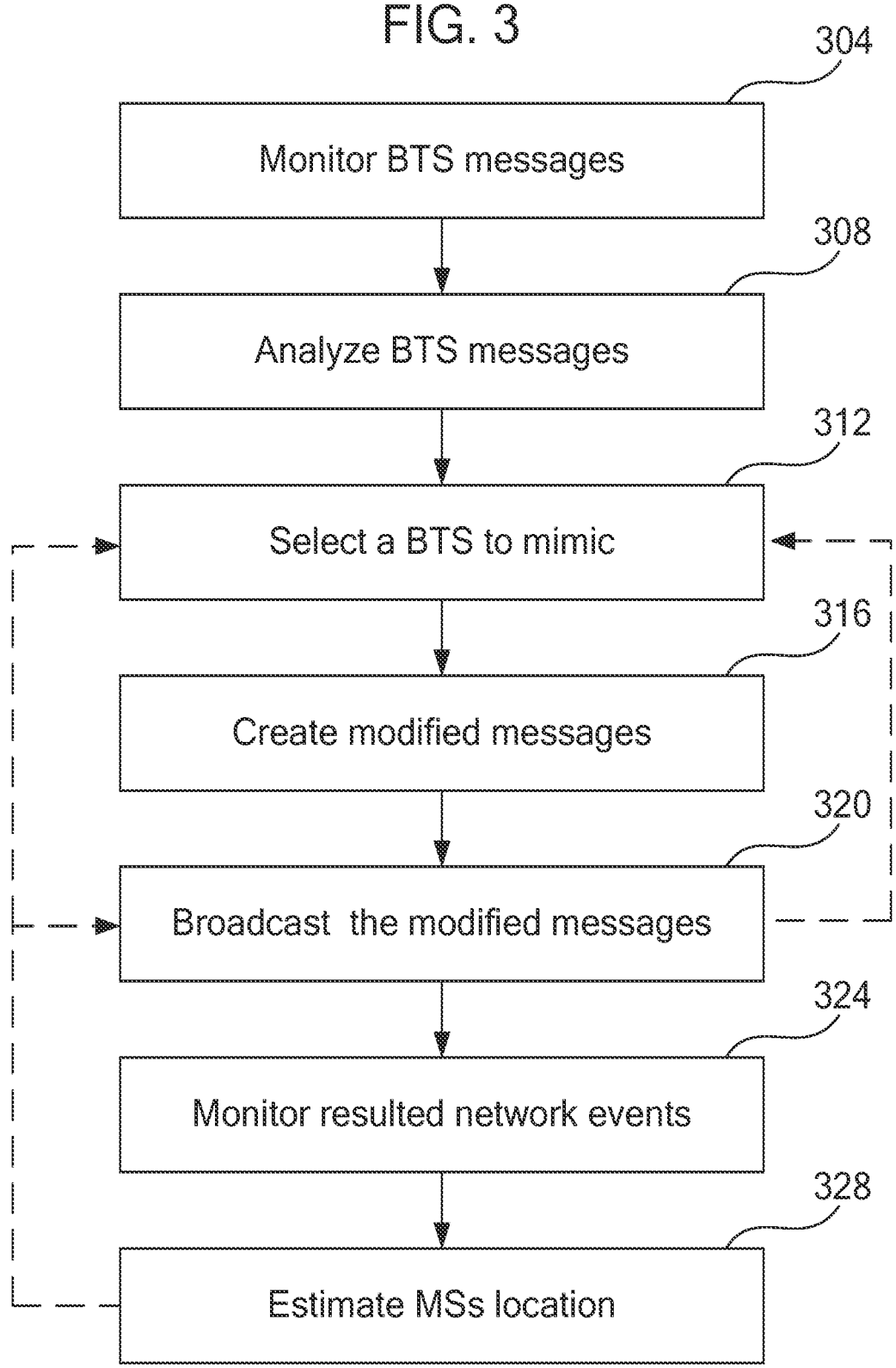

SYSTEM AND METHOD FOR NON-COOPERATIVE STIMULATION OF MOBILE COMMUNICATION TERMINALS

FIELD OF THE DISCLOSURE

The present disclosure relates generally to location tracking, and particularly to methods and systems for tracking user locations in mobile communication networks.

BACKGROUND OF THE DISCLOSURE

Mobile communication networks deploy various techniques for measuring the geographical locations of communication terminals. Such techniques are used, for example, for providing Location Based Services (LBS) and emergency services in cellular networks.

Some communication interception systems masquerade as base stations and log the International Mobile Subscriber Identity (IMSI) numbers of communication terminals in their area. Such systems are commonly known as "IMSI catchers" or "active off-air interrogation systems."

PCT International Publication WO 2010/116292, whose disclosure is incorporated herein by reference, describes a system for obtaining information relating to an idle mobile station in a cellular network. The system generates and sends at least one input signal through a radio network controller to a radio access network, and identifies in data outputted by the radio network controller an output signal resulting from the input signal.

Network Measurement Report (NMR) is a process in which a mobile communication terminal measures and stores signal strengths of neighboring base stations. NMR information is used, for example, for determining when to hand-off a mobile station from one base station to another.

SUMMARY OF THE DISCLOSURE

An embodiment that is described herein provides an apparatus, including:

a receiver unit, which is configured to monitor one or more control messages that are transmitted from one or more first stations to one or more second stations in a wireless network;

a processor, which is configured to select one or more of the first stations based on the monitored control messages, and to create one or more modified messages, which mimic the respective control messages that have been transmitted by the selected first stations while stimulating the second stations receiving the modified messages to induce one or more network events in the wireless network; and a transmitter unit, which is configured to transmit the one or more modified messages so as to stimulate the second stations to induce the network events.

In some embodiments, the wireless network includes a cellular network, the first stations include Base Transceiver Stations (BTSs), and the second stations include Mobile Stations (MSs). In an embodiment, the network events are indicative of a mobility of one or more of the MSs between the BTSs in the cellular network.

In a disclosed embodiment, the control messages include a parameter that is reported by the first stations, and the processor is configured to create the modified messages by replacing the transmission parameter with a discrepant value. In an embodiment, the discrepant value relates to a reported transmit power of the one or more first stations. In another embodiment, the discrepant value relates to a reported location area of the MS. In yet another embodiment, the discrepant value relates to a maximal transmit power that the one or more second stations are allowed to radiate.

In some embodiments, the apparatus includes a location system that is configured to monitor one or more of the network events and to estimate a geographical location of at least one of the second stations based on the monitored network events. In an embodiment, the processor is configured to cause the transmitter unit to transmit the modified messages at two or more different transmit power levels, and the location system is configured to determine the geographical location responsively to the monitored network events and the two or more transmit power levels of the transmitter unit.

In a disclosed embodiment, the processor is configured to select the one or more first stations based on a predefined selection criterion. In an embodiment, the selection criterion selects the one or more first stations that the receiver unit receives at a highest signal level.

There is additionally provided, in accordance with an embodiment that is described herein, a method, including:

monitoring one or more control messages that one or more first stations transmit to one or more second stations in a wireless network;

selecting one or more of the first stations based on the monitored control messages;

creating one or more modified messages, which mimic the respective control messages that have been transmitted by the selected first stations while stimulating the second stations receiving the modified messages to induce one or more network events in the wireless network; and transmitting the one or more modified messages so as to stimulate the second stations to induce the network events.

The present disclosure will be more fully understood from the following detailed description of the embodiments thereof, taken together with the drawings in which:

BRIEF DESCRIPTION OF THE DRAWINGS

FIG. 3 is a flowchart that schematically illustrates a method for stimulating network events, in accordance with an embodiment of the present disclosure.

DETAILED DESCRIPTION OF EMBODIMENTS

Overview

Figure 1:
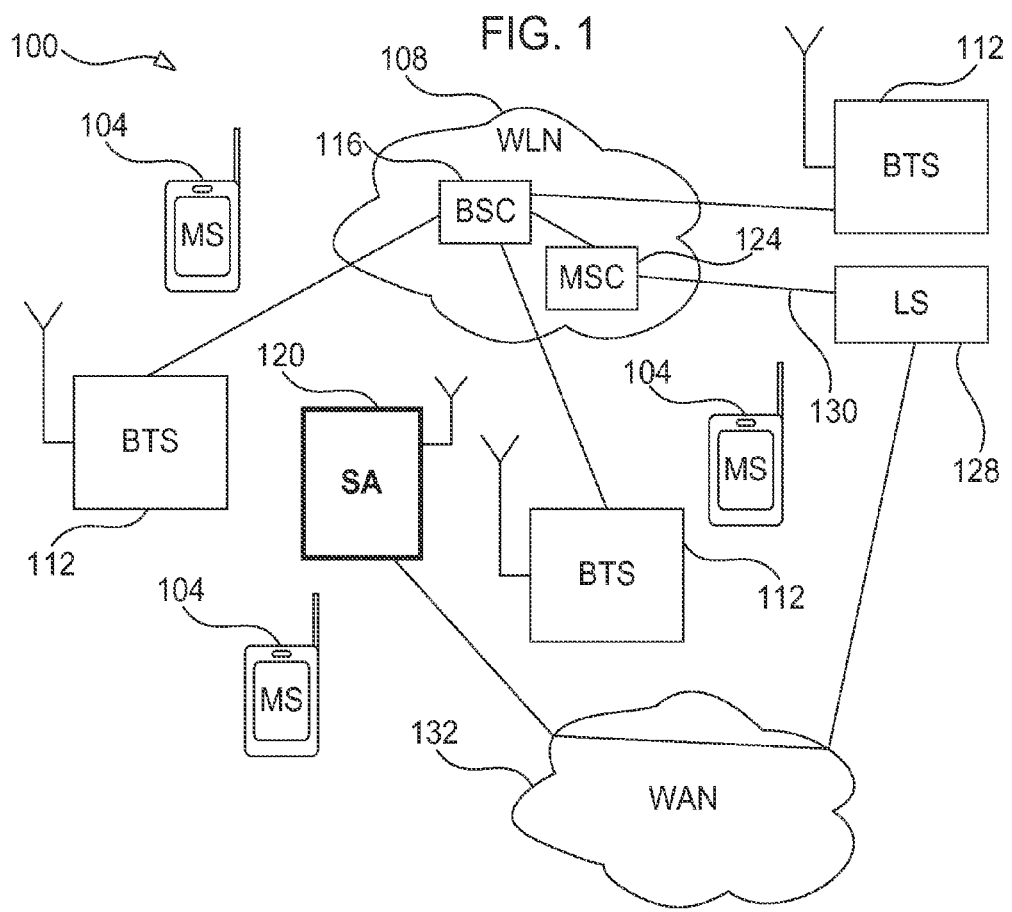
FIG. 1 is a block diagram that schematically illustrates a system for locating mobile stations, in accordance with an embodiment of the present disclosure.

The present disclosure provides improved methods and systems for locating Mobile Stations (MSs) that are served by a Wireless communication Network (WLN) in a given geographical area. The term "locating" is used in this disclosure for brevity to denote estimating the MS location by approximate measurements and calculations. The term MS represents in the present disclosure any suitable kind of wireless terminal, such as mobile phone, mobile computing device and a wireless terminal that is embedded within any kind of a personal computer. The MSs typically communicate with other parties, or connect to the Internet, through the WLN, wherein Base Transceiver Stations (BTSs) serve as the WLN front ends from the MSs perspective.

In typical implementations of the disclosed techniques the MS is assumed to be powered on, though in idle mode, i.e. not within an active call. Thus, the disclosed methods allow for locating MSs whose locations are otherwise undetectable because they do not generate network events. Additionally, the disclosed methods do not rely on either incoming calls or outgoing calls, thus the MS users are typically unaware of the locating process. Furthermore, the disclosed techniques locate the MSs without requiring access to databases or other resources of the WLN, and without requiring active cooperation on the part of the network operator.

The disclosed techniques can be used in a variety of applications in which it is desirable to locate idle MSs in a given geographical area. For example, an intelligence or law enforcement agency may use the disclosed techniques to map the MSs in an area-of-interest, such as an airport. As another example, the disclosed techniques may be applied in a geographical area that has been hit by a disaster event, like an earthquake, in order to locate trapped survivors.

In some embodiments that are described below, a Stimulating Apparatus (SA) constantly sniffs the WLN and monitors control messages that the BTSs in the area of the SA broadcast to MSs that are located in the service areas of the BTSs. The SA analyzes the control messages that it receives, selects one transmitting BTS and creates a modified version of the control messages that it has received from the selected BTS. The modified messages are designed to mimic the messages that were broadcast by the selected BTS, however they are deliberately modified to comprise discrepant transmission parameters, as detailed below. The SA then broadcasts the modified messages on behalf of the selected BTS by using its frequency channel. The discrepant transmission parameters are designed to stimulate any MS that receives them to induce a network event from which the MS location may be estimated.

Example discrepancies that the SA may apply to the modified messages comprise, for example, false location area indication, false transmit power of the mimicked BTS and false maximal power that MSs are allowed to radiate in the cell.

A typical embodiment also comprises a Location System (LS) which is connected to a control center of the WLN. The LS monitors the network events that occur in the SA area, isolates the events that were stimulated by the SA and analyzes them in order to locate the MSs that induced those events. In some alternative embodiments the SA may gradually change the transmit power level at which it broadcasts the modified messages. The LS optionally correlates the network events with the SA power level that stimulated them in order to refine the locating calculations. The SA and LS are connected in some embodiments through a Wide Area Network (WAN) to enable the LS to remotely control the SA operation in accordance with the stimulated network events, for achieving improved performance of the disclosed techniques.

System Description

FIG. 1 is a block diagram that schematically illustrates a mobile station (MS) locating system 100, in accordance with an embodiment of the present disclosure. Three MSs 104 are illustrated in the drawing, representing a plurality of MSs that are located in a given geographical area, wherein location information of MSs is required. In typical embodiments of the disclosed techniques the MSs are assumed to be powered on, though in idle mode, i.e. not within an active call. MSs 104 normally communicate with other parties through a wireless network WLN 108.

In the embodiments described herein WLN 108 comprises a Global System for Mobile communication (GSM) network. Alternative embodiments, however, may comprise any other suitable type of wireless network, in particular networks that operate in accordance with any suitable cellular standard or protocol, such as a Universal Mobile Telecommunication System (UMTS) network, a CDMA2000 network or other third generation (3G) or forth generation (4G) cellular network, an Integrated Digital Enhanced Network (IDEN) network and a WiMAX network operating in accordance with the IEEE 802.16 standard.

In the present example, WLN 108 comprises Base Transceiver Stations (BTSs) 112, one or more Base Station Controllers (BSCs) 116 and one or more Mobile switching Centers (MSCs) 124. BTSs 112 serve as the WLN front end from the MSs perspective. BTSs 112 broadcast control information to idle MSs in their service area by means of "control messages". MSs 104 are "listening" to the control messages and learn thereof the conditions and parameters for registering to the WLN and communicating with the WLN once having a call. An example of such messages is Broadcast Control Channel (BCCH) messages in GSM network. The exact location of a given idle MS 104 within a Location Area (LA) is typically unknown to WLN 108 if it has moved within a cell or has moved from cell to another cell since its last registration to the network. A given MS 104 may typically receive control messages from several BTSs that are active in its geographical area.

System 100 comprises a Stimulating Apparatus (SA) 120, which is located in the geographical area of MSs 104 as a means for locating the MSs. SA 120 constantly sniffs the WLN and monitors the control messages that it receives from BTSs. The SA analyzes the control messages, selects one BTS that transmits them and creates a modified version of the control messages that it has received from the selected BTS. The modified messages are aimed to mimic the control messages that were broadcast by the selected BTS, however SA 120 comprises in them one or more discrepant network or transmission parameters value.

In some embodiments the discrepant parameter comprises a transmit power of the mimicked BTS. In alternative embodiments, SA 120 broadcasts other discrepant parameters for stimulating network events. For example, in Location Area Code (LAC)/Routing Area Code (RAC) update message, the SA mimics a fake LAC (i.e., a LAC that is different from the true LAC of the mimicked BTS), which results in a corresponding response of the MS that is reported to by BTS 112 and BSC 116 to MSC 124. In some embodiments, SA 120 combines the two above-mentioned techniques, i.e., transmits both a discrepant transmit power and a discrepant LAC. The discrepant transmit power causes the MS to move to a different cell, and the discrepant LAC causes generation of a network event indicating change of LAC.

Control messages that can be mimicked by SA 120 are described, for example, in a Third Generation Partnership Project (3GPP) Technical Specification, entitled "Technical Specification Group Radio Access Network; User Equipment (UE) Procedures in Idle Mode and Procedures for Cell Reselection in Connected Mode (Release 9)," TS 25.304, version 9.3.0, Sep., 2009, which is incorporated herein by reference. SA 120 broadcasts the modified messages on behalf of the selected BTS by using its frequency channel. The discrepant network parameters are aimed to stimulate a typical MS that receives them to induce a network event in WLN 108.

A network event may occur, in an example embodiment, when a given BTS 112 transmits at a certain power level, wherein the power level is reported in the control messages that the given BTS broadcasts. SA 120 then substitutes the original power level by a false level in the modified messages that it broadcast on behalf of the given BTS. As a result, the MS detects a discrepancy between the signal strength at which it receives the BTS signal and the signal strength it expects to receive based on the reported transmit power. This discrepancy causes the MS to send a message to the WLN thus inducing a network event. The BTSs that receive the message report the network event to a certain BSC 116, which would typically report the network event to a certain MSC 124.

Typically, the network events induced by the MSs are mobility-related events, which are indicative of the mobility of the MSs between BTSs in WLN 108. For example, a given network event may report the signal strengths at which a given MS receives various BTSs. Such an event is sometimes referred to as a Network Measurement Report (NMR). Another network event may comprise a request from a given MS to change to a different BTS. Alternatively, the MSs may be stimulated by SA 120 to induce any other suitable network event in WLN 108.

A typical embodiment also comprises a Location System (LS) 128, which is connected to MSC 124 through a network connection 130. Network connection 130 may comprise in some embodiments one or more network monitoring means. Such means nay comprise either a "passive probe", a "mirror port", an "in-line tap", any other suitable network monitoring means or any combination thereof. The connection to MSC 124 is given here as an example. However, LS 128 may be connected in some embodiments to any BSC 116 or it can monitor any of the internal interfaces of the WLN, e.g. inter-MSC or MSC-BSC interfaces. The LS monitors the network events that occur in the SA area, isolates the events that were stimulated by the SA and analyzes them in order to locate the MSs that induced those events. The MS locations determined by LS 128 are typically presented to an operator using a suitable output device, and may also be provided to another computerized system and/or stored in a memory for later use.

In some alternative embodiments the SA may gradually change the transmit power level at which it broadcasts the modified messages. Increasing the transmit power level of the SA causes MSs that are further away from the SA to induce network events, and vice versa. Therefore, operating the SA at different transmit power levels, and determining the MSs that are stimulated for each transmit power level, helps to refine the location accuracy. In further alternative embodiments the LS then correlates the network events and the SA power level that stimulated them, in order to refine the locating calculations. LS 128 and SA 120 are optionally connected through a WAN 132, as illustrated in FIG. 1. This connection enables LS 128 to control the SA operation in accordance with the resulted network events, for improved performance of the disclosed techniques, as described below.

The configuration of system 100 shown in FIG. 1 is an example configuration, which is chosen purely for the sake of conceptual clarity. In alternative embodiments, any other suitable system configuration can also be used. For example, system 100 may comprise more than one SA 120, and LS 128 may correlate between the network events that they induce and control them according to the correlation results.

Stimulating Apparatus Structure

Figure 2:
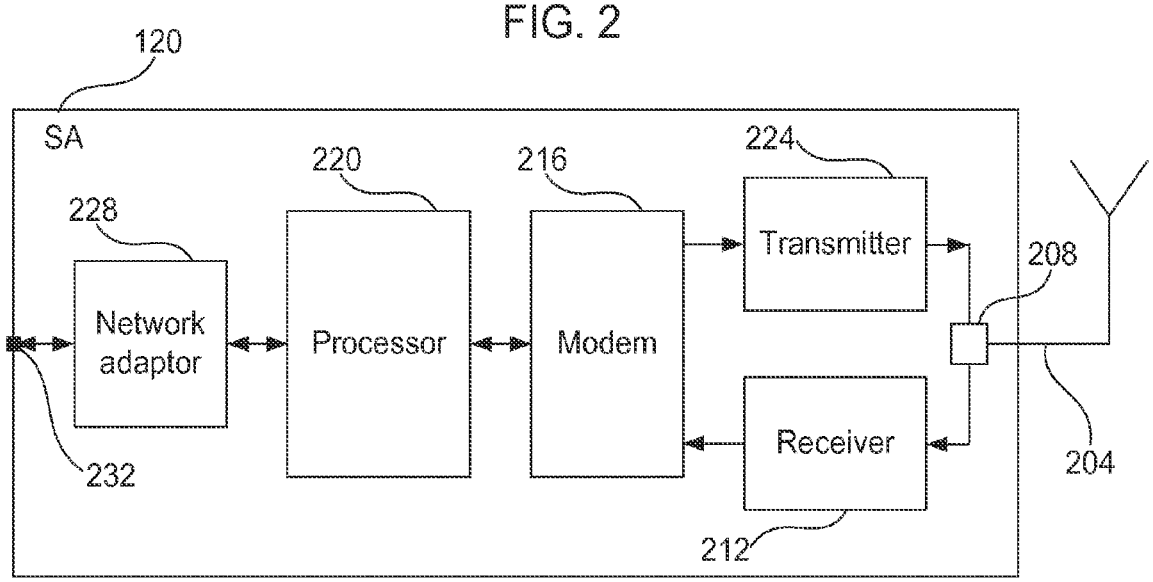
FIG. 2 is a block diagram that schematically illustrates a network event stimulating apparatus, in accordance with an embodiment of the present disclosure.

FIG. 2 is a block diagram that schematically illustrates SA 120, in accordance with an embodiment of the present disclosure. SA 120 comprises an antenna 204 for monitoring the control messages that BTSs 112 broadcast in the area of SA 120. Antenna 204 also transmits the modified messages to MSs 104 as explained above. In the present example, antenna 204 is a vertical omni-directional antenna, however in some embodiments it may comprise a directional antenna array. A diplexer 208 enables the use of antenna 204 for transmit and receive. However in other embodiments that comprise separate antennas for transmit and receive diplexer 208 is omitted. A receiver 212 receives the control messages that BTSs 112 broadcast and converts them to symbols suitable for a modem 216. The modem converts the received symbols to a digital data that is suitable for a processor 220.

The processor analyzes the received control messages, selects one BTS 112 and creates modified messages that imitate the selected BTS as described above. Processor 220 then transfers the modified messages to modem 216, which converts them to transmittable symbols. A transmitter 224 accepts the symbols and transmits the modified messages to MSs 104 that are located in the geographical area of SA 120. A network adaptor 228 enables optional remote control of SA 120 via WAN 132 or any other communication network. In particular, LS 128 can control the operation of SA 120 in accordance with the resulted network events, as explained below.

In some embodiments, the functions of processor 220 are implemented in software running on a suitable processor. In alternative embodiments, some or all of the functions of processor 220 can be implemented in hardware, or using a combination of hardware and software elements. In some embodiments, processor 220 comprises a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

SA elements that are not mandatory for understanding of the disclosed techniques have been omitted from FIG. 2 for the sake of clarity. SA configuration shown in FIG. 2 is an example configuration, which is chosen purely for the sake of conceptual clarity. Any other suitable configuration can also be used in alternative embodiments.

Method of MS Location by Network Event Stimulation

FIG. 3 is a flowchart that schematically illustrates a method for stimulating network events in WLN 108 in order to locate MSs 104 in the geographical area of SA 120, in accordance with an embodiment of the present disclosure. The method begins with a monitoring BTS messages step 304, in which SA 120 sniffs cellular network WLN 108 for monitoring the control messages that BTSs 112 broadcast. The control messages comprise network and transmission parameters that pertain to the BTS's service area, which idle MSs 104 need in order to register and communicate through the network once having a call. An example control message is BCCH message that is used in GSM cellular networks. In an analysis step 308 SA 120 analyzes the control messages that it receives from the BTSs. In a selection step 312 SA 120 selects, in accordance with the analysis, one BTS 112 in order to mimic its control messages. In the present embodiment, SA 120 selects the BTS that is received at a highest signal strength among the received BTSs, however, in alternative embodiments any other suitable selection criterion may be used.

In a message creation step 316 the SA creates a modified version of the control messages that are received from the selected BTS. The modified messages are aimed to mimic the control messages that were broadcast by the selected BTS, however SA 120 comprises in them discrepant transmission parameters value. In some embodiments the discrepantly modified parameter is the reported transmit power of the mimicked BTS. In alternative embodiments the parameter that limits the maximal power that the MSs are allowed to radiate in a cell is valued extremely low. Another discrepant value may be a fake Local Area Identification (LAI). The discrepant network parameters are aimed to stimulate MSs to induce network events in WLN 108.

In a broadcast step 320 SA 120 broadcasts the modified messages on behalf of the selected BTS by using its frequency channel in order to stimulate the idle MSs in the geographical are of SA 120 to induce network events. An example network event is assignment of another serving BTS for a stimulated MS by BSC 116. In some embodiments SA 120 is configured to resume selection step 312 after broadcasting one or more control messages in order to mimic multiple BTSs. This is illustrated by the dashed line looping back from step 320 to step 312 in FIG. 3. In a monitoring network events step 324 LS 128 monitors, via network connection 130, the network events that BSC 116 reports to MSC 124. LS 128 then isolates the events that were stimulated by the SA.

In a location estimation step 328 LS 128 analyzes the stimulated network events in order to locate the MSs that induced those events. LS 128 typically uses in this analysis the parameters that the involved MSs report, for example the signal strength in which they receive the BTSs in their vicinity. In some alternative embodiments the SA may gradually change the transmit power level in which it broadcasts the modified messages. The LS then correlates the network events and the SA power level that stimulated them, in order to refine the locating calculations. In further alternative embodiments LS 128 controls the operation of SA 120 in accordance with actual requirements for locating MSs and/or in accordance with the resulted network events. This is illustrated in FIG. 3 by the left dashed line that goes from step 328 to steps 312 and 320. As an example, LS 128 may instruct SA 120 which BTS, or BTSs, to select, and in which range and pattern to change its transmit power level.

Although the embodiments described herein mainly address MS location in cellular networks, the principles of the present disclosure can also be used in other types of wireless networks.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art.

The invention claimed is:

1. Apparatus, comprising:
    a receiver unit, which is configured to monitor one or more control messages that are transmitted from one or more first stations to one or more second stations in a wireless network;
    a processor, which is configured to select one or more of the first stations based on the monitored control messages, and to create one or more modified messages, which mimic the respective control messages that have been transmitted by the selected first stations while stimulating the second stations receiving the modified messages to induce one or more network events in the wireless network; and
    a transmitter unit, which is configured to transmit the one or more modified messages so as to stimulate the second stations to induce the network events, wherein transmitting the modified messages comprises transmitting the modified messages at two or more different transmit power levels, and wherein estimating the geographical location comprises determining the geographical location responsively to the monitored network events and the two or more transmit power levels of the transmitter unit.

2. The apparatus according to claim 1, wherein the wireless network comprises a cellular network, wherein the first stations comprise Base Transceiver Stations (BTSs), and wherein the second stations comprise Mobile Stations (MSs).

3. The apparatus according to claim 2, wherein the network events are indicative of a mobility of one or more of the MSs between the BTSs in the cellular network.

4. The apparatus according to claim 1, wherein the control messages comprise a parameter that is reported by the first stations, and wherein the processor is configured to create the modified messages by replacing the transmission parameter with a discrepant value.

5. The apparatus according to claim 4, wherein the discrepant value relates to a reported transmit power of the one or more first stations.

6. The apparatus according to claim 4, wherein the discrepant value relates to a reported location area of the MS.

7. The apparatus according to claim 4, wherein the discrepant value relates to a maximal transmit power that the one or more second stations are allowed to radiate.

8. The apparatus according to claim 1, and comprising a location system, which is configured to monitor one or more of the network events and to estimate a geographical location of at least one of the second stations based on the monitored network events.

9. The apparatus according to claim 1, wherein the processor is configured to select the one or more first stations based on a predefined selection criterion.

10. The apparatus according to claim 9, wherein the selection criterion selects the one or more first stations that the receiver unit receives at a highest signal level.

11. A method, comprising:
    monitoring one or more control messages that one or more first stations transmit to one or more second stations in a wireless network;
    selecting one or more of the first stations based on the monitored control messages;
    creating one or more modified messages, which mimic the respective control messages that have been transmitted by the selected first stations while stimulating the second stations receiving the modified messages to induce one or more network events in the wireless network; and
    transmitting the one or more modified messages so as to stimulate the second stations to induce the network events, wherein transmitting the modified messages comprises transmitting the modified messages at two or more different transmit power levels, and wherein estimating the geographical location comprises determining the geographical location responsively to the monitored network events and the two or more transmit power levels of the transmitter unit.

12. The method according to claim 11, wherein the wireless network comprises a cellular network, wherein the first stations comprise Base Transceiver Stations (BTSs), and wherein the second stations comprise Mobile Stations (MSs).

13. The method according to claim 12, wherein the network events are indicative of a mobility of one or more of the MSs between from the BTSs in the cellular network.

14. The method according to claim 11, wherein the control messages comprise a parameter that is reported by the first stations, and wherein creating the modified messages comprises replacing the transmission parameter with a discrepant value.

15. The method according to claim 14 wherein the discrepant value relates to a reported transmit power of the one or more first stations.

16. The method according to claim 14, wherein the discrepant value relates to a reported location area of the MS.

17. The method according to claim 15, wherein the discrepant value relates to a maximal transmit power that the one or more second stations are allowed to radiate.

18. The method according to claim 11, and comprising monitoring one or more of the network events and estimating a geographical location of at least one of the second stations based on the monitored network events.

* * * * *